(12) United States Patent
Baba et al.

(10) Patent No.: US 6,725,345 B2
(45) Date of Patent: Apr. 20, 2004

(54) OBJECT-ORIENTED PROGRAM WITH A MEMORY ACCESSING FUNCTION

(75) Inventors: Yosuke Baba, Kyoto-fu (JP); Motoyuki Kato, Kyoto-fu (JP); Shinji Nakagawa, Kyoto-fu (JP); Hiroyuki Yanagi, Kyoto-fu (JP)

(73) Assignee: Omron Corporation, Kyoto (JP)

( * ) Notice: Subject to any disclaimer, the term of this patent is extended or adjusted under 35 U.S.C. 154(b) by 423 days.

(21) Appl. No.: 09/796,553

(22) Filed: Mar. 2, 2001

(65) Prior Publication Data

US 2002/0123981 A1 Sep. 5, 2002

(30) Foreign Application Priority Data

Mar. 2, 2000 (JP) ......................... H12-056735

(51) Int. Cl.[7] .......................... G06F 12/00; G06F 13/00
(52) U.S. Cl. ..................... 711/154; 711/152; 711/173; 709/104; 717/108; 713/200; 707/103
(58) Field of Search ..................... 711/101, 152–154, 711/171–173; 713/2, 200; 717/108, 116, 157, 165; 709/104; 707/103

(56) References Cited

U.S. PATENT DOCUMENTS

| | | | | | |
|---|---|---|---|---|---|
| 6,128,623 A | * | 10/2000 | Mattis et al. | ........... | 707/103 R |
| 6,141,737 A | * | 10/2000 | Krantz et al. | ............... | 711/171 |
| 6,175,924 B1 | * | 1/2001 | Arnold | ....................... | 713/189 |

OTHER PUBLICATIONS

Duvillier et al. Aug. 1, 2002, US2002/0103819 A1.*

* cited by examiner

*Primary Examiner*—Reginald G. Bragdon
*Assistant Examiner*—Pierre M. Vital

(57) ABSTRACT

An information processing system is provided that is capable of memory access suitable in any programming environment and which increases reliability by varying or restricting program access to memory areas. A number of data storage areas are established in memory that are equal to a number of declared object oriented array elements. Thereafter, memory is addressed using an index value of the indicated array element in the area where the data is stored. If, for example, an array object of a size corresponding to the total size of addresses in the memory is declared, the entire memory will be considered to be the data storage area. A program can then access a memory address by looking up a desired element.

7 Claims, 9 Drawing Sheets

FIG. 3

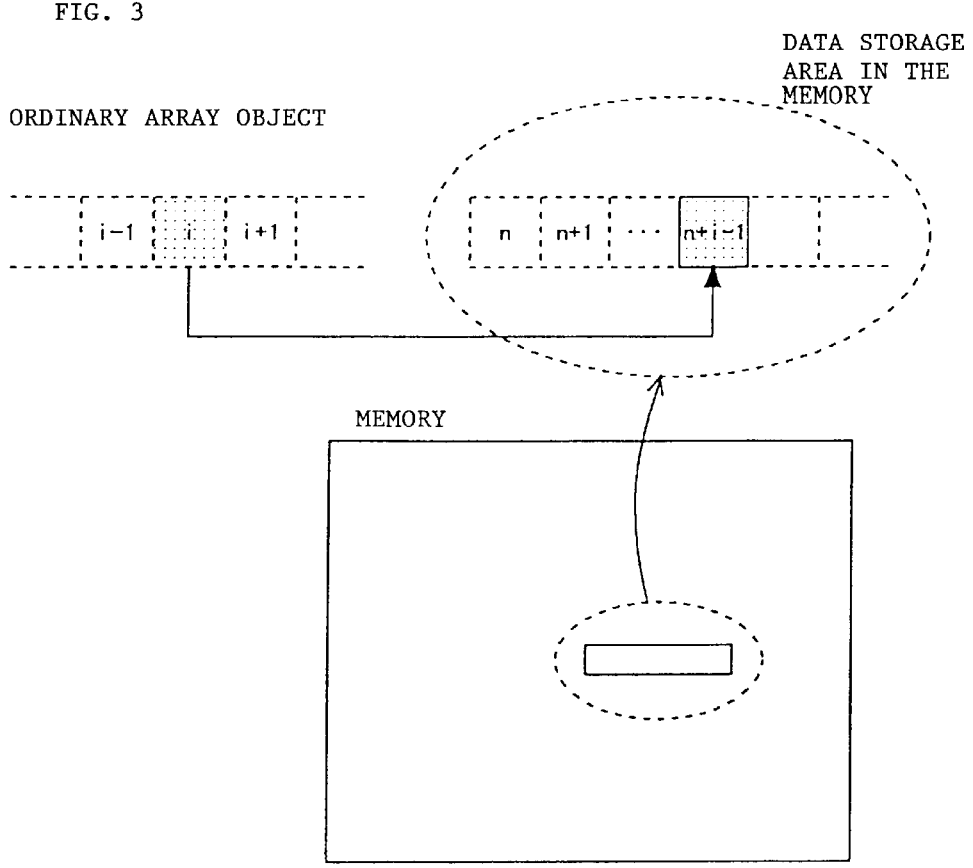

FIG. 4

```
1)   class WriteTest {
2)       byte[] memoryObject;
3)       byte[] arrayObject;

4)       WriteTest(byte[] memoryObject,byte[] arrayObject) {
5)           this.memoryObject = memoryObject;
6)           this.arrayObject  = arrayObject ;
7)       }

8)       void memoryWrite (int memoryAddress,byte writeValue) {
9)           memoryObject[memoryAddress] = writeValue;
10)      }

11)      void arrayWrite (int arrayIndex,byte writeValue) {
12)          arrayObject[arrayIndex] = writeValue;
13)      }
14)  }
```

BYTE CODE FOR
MEMORY WRITE METHOD

```
0 aload_0
1 getfield memoryObject [B
4 iload_1
5 iload_2
6 bastore
7 return
```

BYTE CODE FOR
ARRAYWRITE METHOD

```
0 aload_0
1 getfield arrayObject [B
4 iload_1
5 iload_2
6 bastore
7 return
```

```
1)   class OS {
2)          private byte[] memoryObject;

3)          OS(byte[] memoryObject) {
4)                 this.memoryOject = memoryObject;
5)          }
```

FIG. 11

```
1)  class MemoryObjectReferenceRestrict {
2)      static String list = { "OS","Driver"};

3)      static boolean isPermitted (String className) {
4)          for (int num = 0; num < list.length; num++) {
5)              if (className.equals(list[num])) {
6)                  return true;
7)              }
8)          }
9)          return false;
10)     }
11) }
```

FIG. 12

```
1)  class OS {
2)      private byte[] memoryObject;

3)      OS(byte[] memoryObject) {
4)          this.memoryOject = memoryObject;
5)      }

6)      void run () {
7)          boolean referenceOk =
8)              MemoryObjectReferenceRestrict.isPermitted("Driver");

9)          if(referenceOk == true){
10)             new Driver(memoryObject);
11)         } else {
12)             new Driver(null);
13)         }
14)     }
15) }
```

```
1)   Driver(byte[] memoryObject) {

2)      if (memoryObject != null){
3)         memoryObject[100] = 99;
4)      }
5)   }
```

FIG. 15

```
1)   class MemoryObjectReferenceRestrict{
2)       static String list={"OS","Driver"};

3)   public static byte[] getMemoryObject ( ) {
4)       String className = getClassName();

5)       for (int num = 0; num < list.length; num++ ) {
6)           if (list[num].equlas(className)) {
7)               return memoryObject;
8)           } else {
9)               return null;
10)          }
11)      }
12)  }
13) }
```

FIG. 16

```
1)   class Driver {

2)       void run( ) {
3)           byte[] memoryObject =
4)               MemoryObjectReferenceRestrict.getMemoryObject();
5)           if (memoryObject != null) {
6)               memoryObject[100] = 99;
7)           }
8)       }
9)   }
```

OBJECT-ORIENTED PROGRAM WITH A MEMORY ACCESSING FUNCTION

INDUSTRIAL FIELD

This invention concerns an information processing system in which an object-oriented program is built into a computer. More specifically, it concerns a technique for writing data into and reading data out of an internal memory.

BACKGROUND OF THE INVENTION

Java (a registered trademark, of Sun Microsystems), the object-oriented programming language developed by Sun Microsystems, does not use a pointer to access memory, which prevents data from being improperly written over in the memory. This language can be effectively used to construct an extremely safe system. However, with Java it is not possible to freely access any desired address in the memory as it is with other prior art programming languages using pointers. It is therefore necessary to use one of the following schemes to create a system which would allow a program such as an operating system (hereinafter, "OS") to access the memory.

One way to do this is to build a separate program in the computer, using a language like C, which can access any desired address in the memory. In the program of Java, a method is set up for the memory access. By accessing the method, It will be able to access the memory.

As an alternative, a scheme has also been proposed by which Java can access the memory independently. This involves developing a special compiler to convert a given command to the assembler code needed to access the memory.

The first scheme, which uses an indirect method to access the memory, requires time to start the program to access the method. Accessing the memory is inefficient, and it is difficult to operate the system at high speed. It cannot be used in devices which have rigorous real-time requirements.

The system which uses the second method, involving a separate compiler, would be difficult to implement in a device which has only a standard-specification compiler. It is not a system with universal application.

On the other hand, a programming language which accesses the memory using a pointer has no way to restrict which programs can access the memory, so it has no way to prevent improperly overwriting data in the memory.

SUMMARY OF THE INVENTION

The present invention is developed in consideration of the problems described above. Its objective is to provide an information processing system capable of instantaneous memory access which can be suitable for use in any programming environment.

The second objective of this invention is to provide a highly reliable information processing system in which the programs with access to the memory can be restricted in order to prevent accidental overwrites.

The third objective of this invention is to provide a convenient information processing system which can maintain its reliability by using a program to vary the accessibility of different areas of the memory.

As can be seen in FIG. 3, when one or more array objects are declared in an environment created by an object-oriented language such as Java, a number of data storage areas is established in the memory which is equal to the number of object array elements declared. Thereafter, whenever it receives a command to write or read data involving a given element of one of the array objects, the program looks up the address which corresponds to the order of the indicated element in the array (which is indicated in the program as the value of a index appended to the object name) in the area where the aforesaid data are stored. (Hereafter, this sort of reading and writing of data using array elements is called "element reference".)

If, for example, we are to declare an array object of a size corresponding to the total size of addresses in the memory, the entire memory will be considered to be the data storage area. Then by looking up the given element, we can access whatever address in the memory we desire.

This invention makes use of the principle described above. The information processing system disclosed in claim 1 of this application has an object reference table to distinguish the areas where different sets of object data that are established by an object-oriented program are stored; and a program executing means to execute the aforesaid program while distinguishing, by means of the aforesaid object reference table, the correct data storage area for an object indicated by the aforesaid program.

In the aforesaid object reference table according to this invention, is stored a number of virtual array objects (also referenced as memory objects) proportional to the number of addresses in the memory of the computer housing this information processing system. When the program executing means receives a message to indicate that a given element in a virtual array object should be looked up, it determines, based on what is listed in the aforesaid object reference table, that the entire memory is a data storage area of the aforesaid virtual array object, and it looks up the aforesaid given element.

To construct the aforesaid object-oriented program, one can use a programming language like Java which does not employ a pointer to access the memory, or a language like C++ which does use a pointer, provided that pointer access is prohibited. The program executing means to execute the program can be realized by a device to execute the byte code or machine language obtained by compiling these programs (a compiler or interpreter); or by a means to identify the area where the data representing the object indicated by the program is stored by looking it up in an object reference table (in concrete terms, this will have a program to control the order of discrimination processing).

In addition to the configuration disclosed in claim 1, the information processing system related to the invention disclosed in claim 4 of this application has a built-in access restricting means to restrict access to the computer's memory depending on what sort of program is to be executed. When a program is to be executed whose access is permitted by the access restricting means to restrict access, the access restricting means receives a message or command indicating that it should look up a given element in the aforesaid virtual array object. It finds in the object reference table that the data storage area for the virtual array object consists of the entire memory, and it executes its reference processing with respect to the aforesaid indicated element.

The aforesaid access restricting means might, for example, permit a program consisting of the OS to access the memory but deny access to a program consisting of an ordinary application. It would, in other words, restrict access to the memory according to what the program's function is or what type of program it is. In addition, access to the memory can be restricted by using as a criterion the developer of the program, the version of the program or the date of its creation, the name of the program, or a password.

According to the invention disclosed in claim 5 of this application, the aforesaid access restricting means to restrict memory access has built into it a table which it uses to determine which programs are permitted to access the aforesaid memory.

This table can, for example, be a table which stores names of programs or numbers used to discriminate classes of programs which should be permitted to access the memory; or it can be a table in which the names of all classes of programs are stored; classes which are permitted access are flagged.

With the invention disclosed in claim 6 of this application, a virtual array object of a size proportional to the number of addresses stored in an area of permitted access established in a given location in the computer's memory is stored in an object reference table so as to correspond to the area of permitted access. When the program executing means receives a program telling it to look up a given element in the aforesaid virtual array object, the program executing means determines, based on the aforesaid object reference table, that the aforesaid area of permitted access is the area where data representing the aforesaid virtual array object are stored, and it looks up the indicated element.

Like the invention disclosed in claim 4, the information processing system provided by the invention disclosed in claim 7 of this application has an object reference table, a program executing means to execute a program and a access restricting means to restrict access to the memory. The access restricting means in claim 5 controls access to multiple memory objects based upon program or method category. (In some cases, the program will not be allowed to access any areas at all.)

For each area of permitted access, a virtual array object of a size proportional to the number of addresses in that area is stored in an object reference table. When it is to execute a program which is permitted access to a given area by the aforesaid access restricting means, the program executing means receives a message telling it to look up a given element in the array object corresponding to the area of permitted access. It determines, based on the aforesaid object reference table, that the aforesaid area of permitted access is the area where data representing the aforesaid virtual array object are stored, and it looks up the indicated element.

The invention disclosed in claim 2 of this application comprises one of the configurations described in claims 1, 4, 6 or 7. When the aforesaid computer is started, the object reference table with the aforesaid virtual array objects stored in it is initialized.

With the invention disclosed in claim 3 of this application, a number of virtual array objects of different types are stored in the aforesaid object reference table.

With the invention in claim 1, a virtual array object of a size commensurate with the number of addresses in the memory is created. Each element of this array object corresponds to an address in the memory. The desired address in the memory can be accessed by executing a program to look up a given element of the object. The area where the data representing this array object is stored is established virtually, so ordinary objects designated by the program will not be affected by these special array objects. A private data storage area can thus be secured in the memory, and accessing this area will not pose any particular problems.

The virtual array object is stored in an ordinary object reference table so that it can be distinguished from data storage areas for ordinary objects designated by the program. Thus the program to look up the aforesaid elements can be described using the same grammar as the program to look up elements of ordinary array objects. This makes it possible to look up elements in a generalized environment of program execution.

With the invention in claim 4, when a command or message is received to look up an element of the aforesaid virtual array object, the address in the memory which corresponds to the indicated element will be accessed only when the program being executed is one which is permitted access to the memory.

With the invention in claim 5, a table can be set up to allow programs which the developers trust to access the memory. Thus only programs stored in the table will be able to look up elements of the virtual array object.

With the invention in claim 6, programs are permitted access only to an area of a given size in the memory which is designated as accessible, and they are forbidden access to addresses outside this area. With the invention in claim 5, a number of areas are established to which access depends on the type of program being executed and its capabilities. This allows the areas which may be accessed to vary depending on the program being executed.

With the invention in claim 2, a virtual array object which is not defined in an actual program is created when the object reference table is set up as the computer is initialized.

With the invention in claim 3, a number of array objects of different shapes are created in the object reference table. By changing the object to be looked up, one can make it conform to the size of the data when it is accessed.

BRIEF DESCRIPTION OF THE DRAWINGS

FIG. 3 shows a relationship between an ordinary array object and the actual address in the memory unit.

FIG. 4 is a Java program in which writing commands of memoryWrite and arrayWrite methods are shown.

FIG. 11 is the Java program for the flow chart shown in FIG. 10.

FIG. 12 shows an example of an OS class program in which the aforesaid "isPermitted" method has been accessed.

FIG. 15 is a Java program for the flow chart shown in FIG. 14.

FIG. 16 shows an actual example of a program which requests access to the aforesaid memory object.

DETAILED DESCRIPTION OF THE INVENTION

Figure 1:
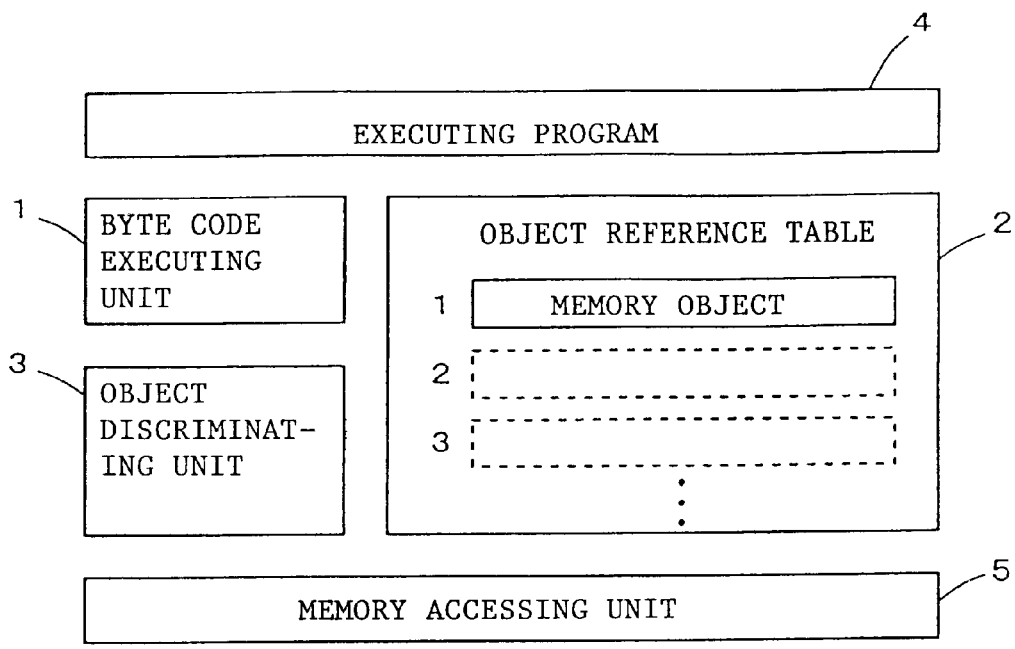
FIG. 1 is a first functional block diagram showing the data processing system according to this invention.

FIG. 1 shows the configuration of an information processing system related to the first preferred embodiment of this invention.

This information processing system, which is designed for a device with a built-in computer, is based on a source program written in Java. It comprises byte code executing unit 1 to execute byte code; object reference table 2; object discriminating unit 3 to discriminate objects; executing program 4, the program to be executed; and memory accessing unit 5 to access the memory.

The aforesaid executing program 4 is translated from the source program into byte code (an intermediate code) by a compiler (not pictured). Byte code executing unit 1 is an interpreter to execute byte code. When unit 1 receives a message telling it to create a new object, it associates the name of the object with a number it will use to recognize it and stores these data in the aforesaid object reference table 2. It also links the aforesaid number to data representing the object's definition and the address of the area where its variables are stored.

When byte code executing unit 1 receives a command in a program to look up an object, object discriminating unit 3 discriminates the ID number of the indicated object in the object reference table 2 using the object name in the program. In actual terms, this is done by a program which controls the order of the aforesaid discrimination processing and by a unit to execute that program. Based on the data linked to the ID number of the object discriminated by unit 3, unit 1 recognizes the area where the object's variables are stored.

Memory access unit 5 accesses the memory, reads and writes data corresponding to a given address in the memory. (In real terms, it would be a data bus which links the CPU and the memory.) Unit 5 receives from unit 1 the address indicating where the aforesaid variables are stored and writes or reads data into or out of that area.

If the aforesaid new object is an array object, a data storage area is established in the memory of a size corresponding to that of the array object. When there is a request through one of the elements in the array object to read or write data, byte code executing unit 1 receives a message in the form of indexes attached to the array indicating which element is to have data read or written. (Hereinafter, reading and writing data through an element will be referred to as "looking up an element"; indicating an element will be referred to as "request of looking up an element".) Based on the result of the discrimination task executed by the aforesaid unit 3, unit 1 accesses the part of the data storage area in the virtual array object which corresponds to the indexes in the aforesaid request to look up an element, and it writes in or reads out data.

The aforesaid object reference table 2 is set up in a given location of the memory by the initialization program immediately after power is supplied to the computer. Ordinarily, with this type of system the object reference table 2, which is set up when the computer is initialized, will be empty. In this embodiment, however, the virtual array object named as "memory object" is stored in object reference table 2 during initialization with the recognition code "1" attached to them.

Each time it creates a new object, byte code executing unit 1 assigns that object a number in object reference table 2 which has not yet been used. Thus objects created after the system is initialized will be assigned recognition codes in order starting with "2", and the recognition code assigned to a memory object will never have to be changed.

The scheme described above is not the only one which may be used to generate "memory object". The first program executed after the system is initialized could generate an array object which is then called the "memory object." Unit 1 would then be set to recognize this array object as a virtual object. The aforesaid memory object would then be stored in the initially empty object reference table 2 as a virtual array object with the code "1". However, to access the memory immediately after starting the system, it would be necessary during initialization to set up an object reference table 2 like the one in this embodiment, in which the memory object is stored.

The aforesaid memory object must be an array object of a size proportional to the total number of addresses in the computer. In other words, it must be set up using the computer's address 0 as its first address so that it has the same number of elements as the number of addresses in the memory. When unit 1 to process byte code receives a request to look up an element of a memory object, the aforesaid unit 3 determines from the object's name that it is being requested to look up the virtual object with the number "1". When it receives the result of this determination, unit 1 to execute byte code recognizes the entire memory as the area where the data representing this object are stored. It accesses the address which corresponds to the code attached to the array for the aforesaid requested element and writes in or reads out data.

Since this memory object is not generated by an actual program, it does not have a guaranteed area in the memory where its data are stored, as generated objects ordinarily would. Therefore ordinary objects will not be affected by the memory object. They are assured their own data storage area, in which they can be freely accessed.

Figure 2:
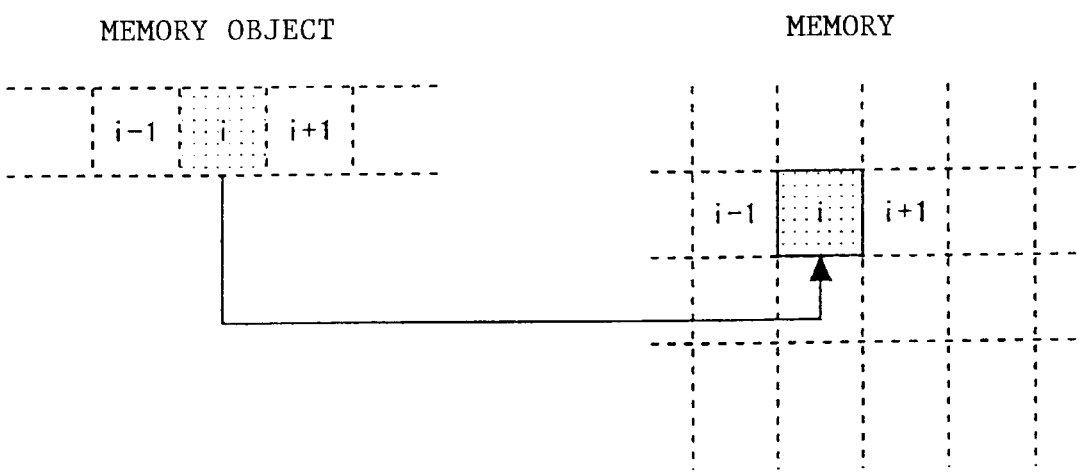
FIG. 2 shows a relationship between a memory object of this invention and the actual address in the memory unit.

We shall now explain how a memory object differs from an ordinary array object with reference to FIGS. 2 and 3.

A memory object is a one-dimensional array having a number of elements equal to the number of addresses in the memory. As can be seen in FIG. 2, the data for element i are stored at address i in the memory. An ordinary array object, in contrast, is accessed only in the data storage area assigned to the object in the memory. As can be seen in FIG. 3, if we call the first address in the data storage area n, the data for the i-th element of the object will be stored at address (n+i−1).

Computers normally have both a ROM and a RAM. If addresses are established for the numbers in the memory and a given number expresses straightforwardly some designated location in the memory, we should be able to access every address in either memory using a memory object. However, the user will be restricted from writing data into the ROM.

With this kind of memory object the entire area of the memory may be secured. An address which must be accessed in the memory can then be attached as index to a request to look up an element, and data can then be written into or read out of that address.

In a program executed by Java, a request to look up an element is described in the same fashion regardless of whether the object indicated is a memory object or an ordinary array object. Thus, the standard JAVA compiler can execute the claimed invention. When it receives a request to look up an element of a memory object, the unit 1 to execute byte code does not need to perform any special processing, as it can access the indicated address using the same scheme it uses to access an ordinary array object.

In the example of a program given below, every element of a memory object is expressed in byte form, so the memory is accessed in byte units. However, if the memory objects are expressed as int arrays, the memory will be accessible in int units. By the same token, if the objects are expressed as double arrays, the memory will be accessible in double units.

FIG. 4 shows the Java program (of the class "WriteTest") used to write the procedure by which memory object and ordinary array objects (called simply "array objects") are written into the memory. For purposes of explanation, each line of the program has been numbered in the figure. (Lines will be numbered in this way in all succeeding programs shown in figures.)

When the instance is generated in lines 4 through 7 of this program, the variables designated as constructor arguments, "memory object" and "array object", are each given a reference as a memory or array object. In this "WriteTest" class, this is what enables the user or requesting program to request that they desire to be looked up.

In the "memoryWrite" method, in lines 8 through 10, a value representing the variable "writeValue" is written into the element representing the variable "memoryAddress" in the memory object. In the "arrayWrite" method, in lines 11 through 13, a value representing the variable "writeValue" is written into the element representing the variable "array index" in the array object. In this way all the values are defined.

Figures 5, 6, 7:
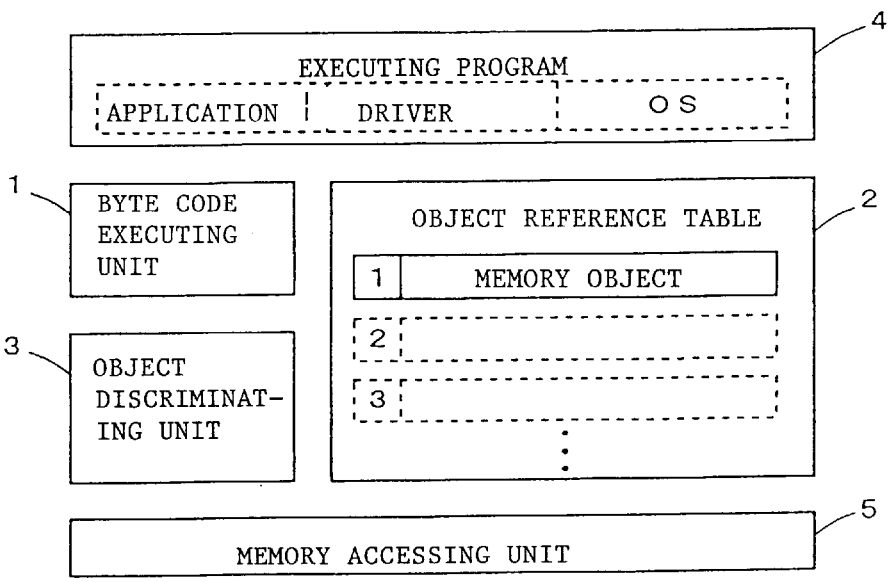
FIG. 5 shows the results after the memoryWrite and arrayWrite methods are compiled.
FIG. 6 is a second functional block diagram showing the data processing system according to this invention.
FIG. 7 is an example of how to set up permission to access the memory in a program consisting of the OS.

FIG. 5 shows the result of compiling the Java source program in FIG. 4 above.

In this figure, the box on the left shows the result of compiling the "memoryWrite" method in lines 8 through 10 of FIG. 4. The box on the right shows the result of compiling the "arrayWrite" method in lines 10 through 13 of FIG. 4. In both boxes, the portions where the code is different are shown in boldface print. As is made clear in this figure, the byte code representing each method is identical with the exception of the portion indicating the object's name.

When it receives the byte code of either method described above, unit 1 to execute byte code will recognize that the byte code in line 1 is a command to write data into an array element. The byte code in line 2 gives the object that is written in a name. With the "memoryWrite" method, when the aforesaid object reference table 2 is used, a request to look up an element of a virtual array object with the identification number "1" attached to it will establish that the entire memory will be considered the data storage area.

Accordingly, once values are stored in the aforesaid variables "memoryAddrss" and "writeValue" in a given location of the aforesaid program 4, the program to be executed, and the aforesaid "memoryWrite" method is accessed, data can then be written into any address in the memory.

In the aforesaid FIG. 4, the program used a memory object to write data into the desired address in the memory. However, if one wished to read data out of the desired address, a method could also be established whereby data stored in a given element could be read just as they would be from an ordinary array object.

Thus a request to look up an element of a memory object is expressed in the source program using the same scheme as a request to look up an element of an ordinary array object, and it can be converted by an ordinary Java compiler. Thus unit 1 to execute byte code can execute the same processing to look up a memory object as it would to look up an ordinary array object. We see, then, that it is quite simple to access the memory using a Java program.

Nevertheless, if the looking up of memory objects is not restricted in any way, data in the memory may be accidentally written over or erased just as happened in the prior art when a pointer was used to access the memory.

This is why in the embodiment which follows only programs which make the best use of their object-orientation and have proved themselves reliable are permitted access to memory objects.

The information processing system shown in FIG. 6 has, for the most part, the same configuration as the first embodiment. The executing program 4, the program requesting memory access, includes various types of programs, such as OS programs and drivers or applications managed by OSs.

In this embodiment, too, object reference table 2, in which the memory object is set up, is generated as soon as the system is started. However, only some programs designated by the developers of the system, such as the OS and selected drivers, are permitted to access the entire memory. To limit access to the memory, the developers establish criteria to determine which programs will be allowed total access. Only programs which are permitted total access are given a designation which allows them to look up the memory object.

FIG. 7 is an example of how we would set up permission to access the memory in a program consisting of the OS (name of class: OS; hereafter referred to as "class OS"). The variable "memoryObject" designated as the constructor argument is given a reference as a memory object. Then when programs of the OS class receive a request to look up an element written by the aforesaid "memoryWrite" method, they will be able to access the designated address in the memory and write in or read out data.

Since the aforesaid variable "memoryObject" in line 2 of FIG. 7 is declared to be private by having modifying indexes attached to it, other classes of programs will not recognize or be permitted access to this variable.

Figure 8:
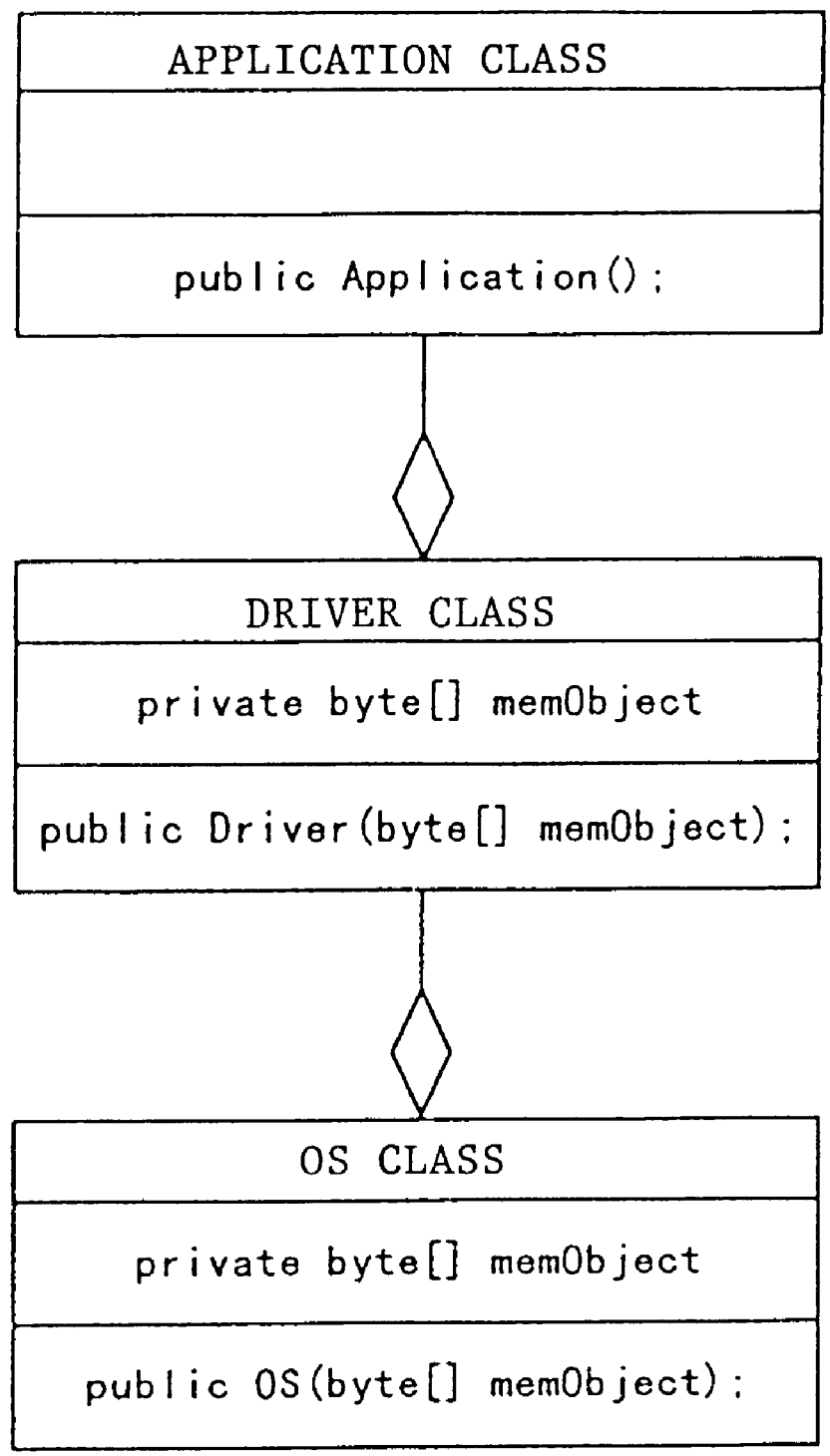
FIG. 8 shows how the programs in the information processing system in the aforesaid FIG. 6 are related and gives examples of how to set up a reference for a memory object in each program.

FIG. 8 shows how the programs in the information processing system in the aforesaid FIG. 6 are related and gives examples of how to set up a reference for a memory object in each program.

In the example shown, the programs are given labels indicating what type of program they are: OS class, driver class or application class. OS class programs are started up when the system is activated. Driver class programs and application class programs are then started up in that order.

As in the aforesaid FIG. 7, OS and driver class programs have a variable called "memoryObject" with the modifying indexes "private" attached to it. They also have a constructor with the reference of this memory object, through this variable, as its argument. Programs of the application class don't have a reference for the memory object, so they cannot recognize references for OS or driver class memory objects.

As a result, when OS or driver class programs receive a request to look up an element, they can access the desired location in the memory; but application class programs do not have free access to the memory. Even if the aforesaid "memoryWrite" method is attempted by an application class program, it cannot be executed correctly.

In the embodiment we have been discussing, only programs whose reliability can be vouched for, such as those the system designers have developed themselves, are permitted to look up a memory object. Imported programs which can't be vouched for are not permitted to look up a memory object, nor are they allowed to reference a memory object of an OS class program. Thus data in the memory can never be accidentally written over or erased, which substantially increases the security of the system.

Figure 9:
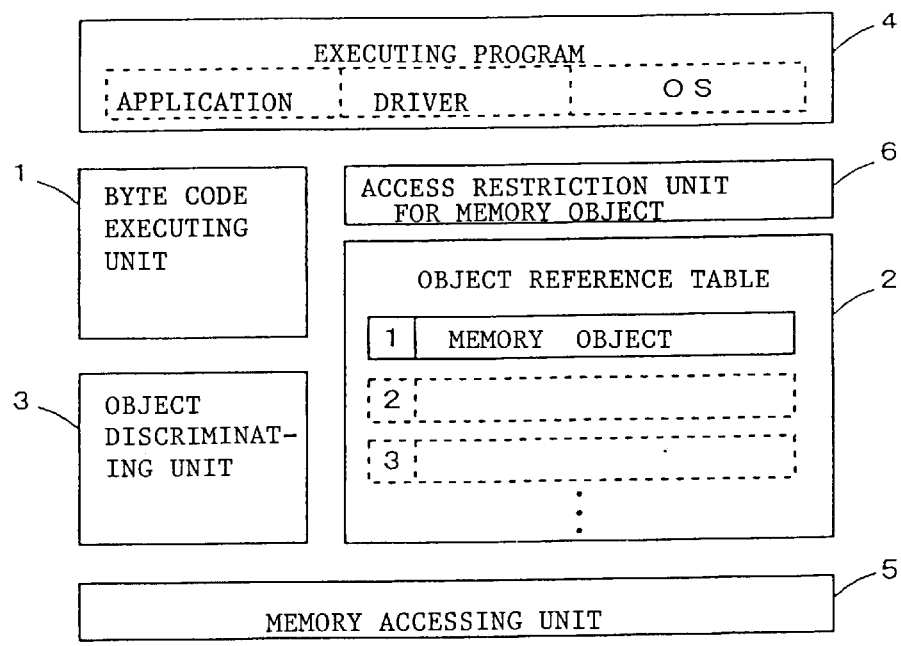
FIG. 9 is a third functional block diagram showing the data processing system according to this invention.

FIG. 9 shows a third example of an information processing system according to this invention.

In this embodiment of an information processing system, unit 6 to restrict reference to memory objects is the device which determines which programs will be allowed access to the memory. Just as in the second embodiment, program 4, the program to be executed, contains various subprograms, including the OS, the driver and applications. Since unit 1 to execute byte code, object reference table 2, unit 3 to distinguish objects and unit 5 to access the memory are identical to those components in the aforesaid first and second embodiments, we shall refrain from discussing them in detail at this point.

In actual terms, the aforesaid unit 6 to restrict reference to memory objects consists of a program in byte code obtained by compiling a source program written in Java and the means to execute that program. In the aforesaid program is a table supplying criteria by which it can be determined whether a given program should be allowed access to the memory. This table may store names of classes or index numbers of programs permitted access, or it may flag such programs.

In this information processing system, one of the following two methods is used to restrict the access of program 4 to the memory.

In the first method, only the most trustworthy program (here, the OS) is given a reference for the memory object, just as in the aforesaid second embodiment. When the OS activates other programs, only those recognized by unit 6 are given a reference for the memory object. In the second method, the program being executed sends a request to unit 6 that it be allowed to look up a memory object. Only programs which are supposed to be permitted to access the memory are given a reference to the memory object by unit 6.

In this section we shall give practical examples of the two processing schemes described above in the order in which they were introduced.

Figure 10:
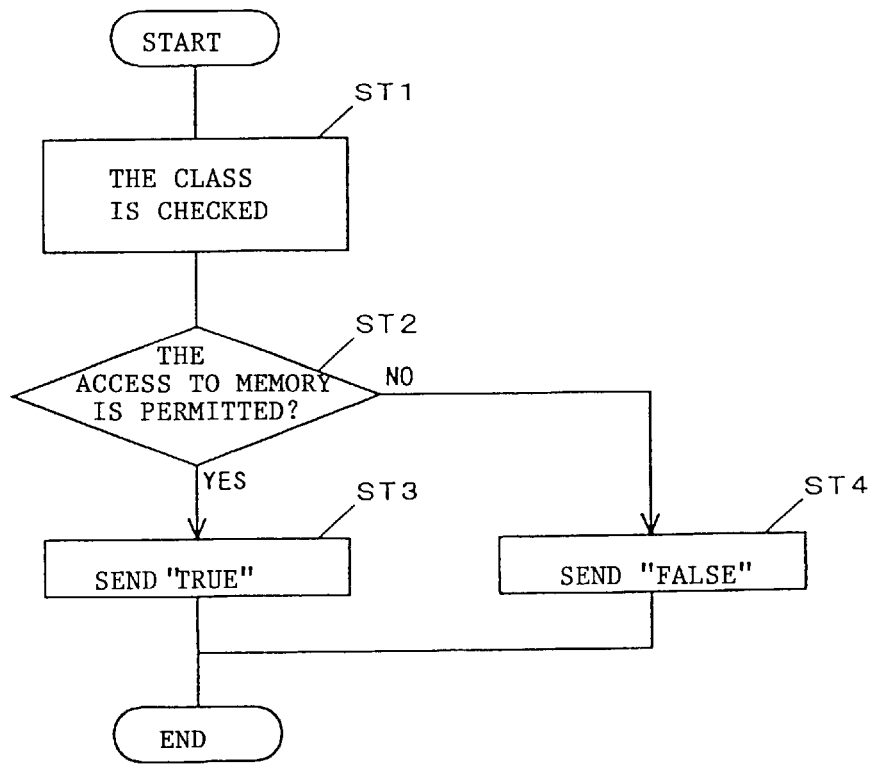
FIG. 10 is a flow chart showing the process in access restriction unit.

FIG. 10 shows the order of processing executed by unit 6 when the first method described above is implemented. When the class of the program activated by the OS class program is sent to it, unit 6 looks up the class in the aforesaid table in Step 1 and determines whether this class of program is permitted access to the memory. If it is, we proceed from Step 2 to Step 3 and send the OS the result "true". If this class of program is not permitted access to the memory, we proceed from Step 2 to Step 4 and send the OS the result "false".

Only if the OS receives the result "true" will it give the aforesaid program being activated reference to the memory object.

FIG. 11 is an example of a program which might be set up in the unit to restrict reference to the memory object to execute the procedure in the aforesaid FIG. 10. (The class name is "MemoryObjectReferenceRestrict". Hereafter it is referred to as the "class to restrict reference to memory objects".)

Line 2 in the figure sets up the aforesaid table to determine access. Here, a list is created which contains the names of classes of programs (in the example, "OS" and "driver") permitted reference to the memory object. What names will be stored in the table is determined by the system designers. The list may be amended as needed.

The program in lines 3 through 10 is the method (the "isPermitted" method) by which the procedure in Steps 1 through 4 in the aforesaid FIG. 10 is implemented. The name of the class sent by the OS is housed in the variable "className". The program then checks whether this name is stored in the aforesaid table. It returns a result of "true" or "false".

FIG. 12 shows an example of an OS class program in which the aforesaid "isPermitted" method has been accessed. As in the aforesaid FIG. 7, lines 3 to 5 in the figure comprise a constructor with the variable "memoryObject" modified by "private" as its argument. The aforesaid variable is given reference to memory objects which are array objects.

Lines 6 to 14 are the program used when driver class programs are activated. The "isPermitted" method for the aforesaid class to restrict reference to memory objects is accessed with "Driver", the name of the class, as the argument. When "true" is returned, the driver class program, which is now permitted reference to the memory object, is activated. If "false" is returned, the driver class program is activated with reference to a null object.

Figures 13, 14:
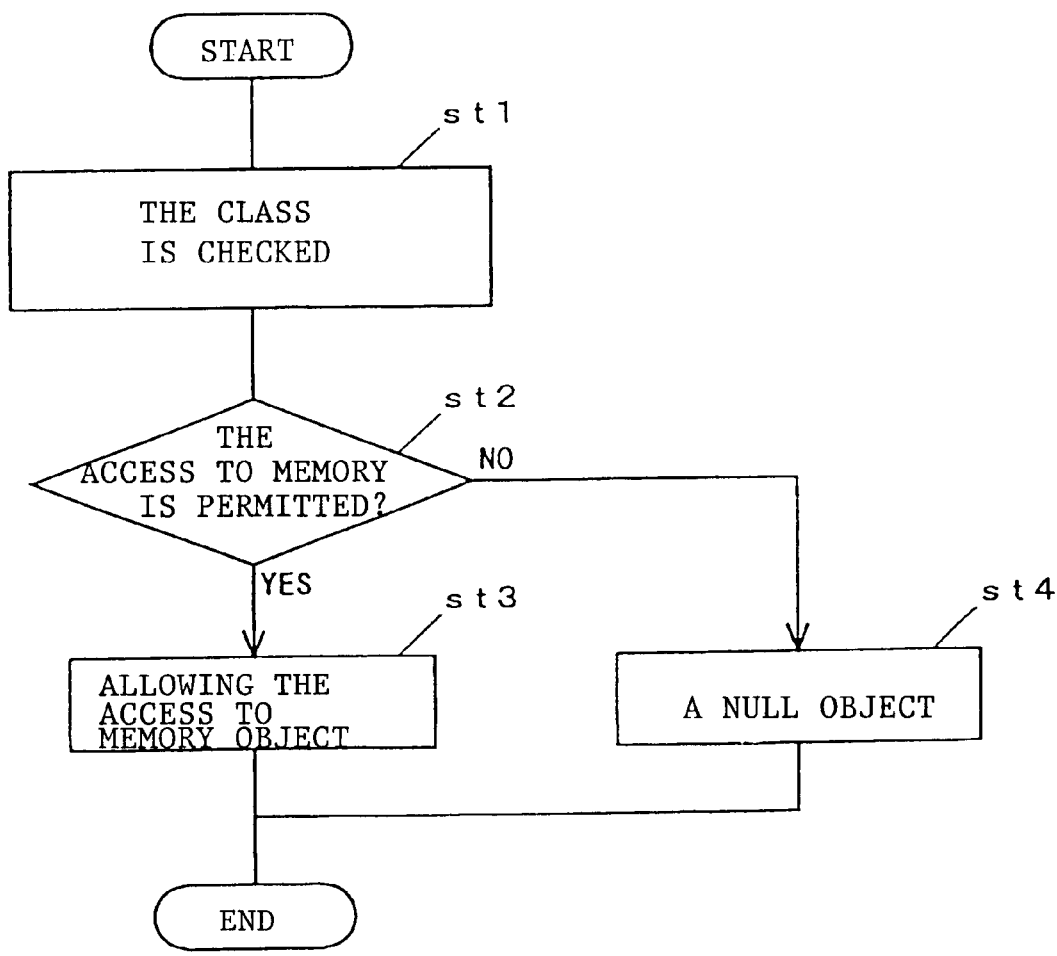
FIG. 13 is a driver class program to get reference to the memory object.
FIG. 14 is a flow chart showing the order of processing executed by the access restricting unit.

If the driver class program has a method to get reference to the memory object, like that shown in FIG. 13, driver can then access the designated address in the memory in response to the received request then the driver can write in or read out data.

In the program, in lines 2 to 4 of FIG. 13, the value "99" is written into address 100 of the memory when the OS gives the memory object a reference. If it does not give the object a reference, nothing is done.

FIG. 14 shows the order of processing executed by the unit to restrict reference to the memory object when the second method is used. (To distinguish this procedure from that in the aforesaid FIG. 10, we specify each step with a number.)

The procedure begins when a request is received from a given class of program to reference a memory object. In Step 1, the program obtains the name of the class of program which has submitted the request. It checks whether this name is one of those stored in the aforesaid table. If it is, we proceed from Step 2 to Step 3 and allow the program access to the memory object. If it is not, we proceed to Step 4 and provide the program a null object.

FIG. 15 shows an actual example of a class of programs with restricted access to memory objects which are the target of the procedure executed in FIG. 14. FIG. 16 shows an actual example of a program which requests access to the aforesaid memory object. The program in FIG. 16 is one of the desired class (in the example, driver class) in program 4. In the "run" method shown in the figure, the portion which accesses the "getMemoryObject" method (lines 3 to 4) for a class of program with restricted access is equivalent to a request to access the aforesaid reference.

To access the aforesaid method for a program of a class with restricted access, we use the "getClassName" method in line 4 of FIG. 15 to obtain the name of the class of program that has submitted the aforesaid request to access the object. Lines 5 through 11 correspond to the processing in the aforesaid Steps 2 through 4. The program determines whether the name of the class of program which originally accessed the aforesaid method is stored in the table. It gives that class of program access either to the memory object or to a null object.

The "getClassName" method in the aforesaid line 4 identifies the class of the program which accessed the aforesaid method based on a stack or list configuration in the system. In response to the request to access the method, unit 1 to execute byte code, the getClassName method stacks the work areas (i.e., searches the frames or list contents) of the accessed method. At the same time, as the method is executed, data generated in the process, the name of the method (or its identification number) and the name of the class of program (or its identification number) are stored in the method's frames. By looking back over the frames, the aforesaid "getClassName" method can identify the class of the method request access and obtain the name or the identification number of the class. In this way the class of the program, which accessed the aforesaid "getMemoryObject" method, can be used to determine, for classes with restricted access, the class of the method that issued the request to access the aforesaid "getMemoryObject" method. This can be done, then, without using the name of the class as an argument.

The aforesaid "getClassName" method can prevent classes of programs which are forbidden access to the memory from using a false name as an argument and executing a "getMemoryObject" method to get access to a memory object. This method thus enhances the security of the system.

The class of each method requesting access using the "getMemoryObject" method to the memory object can be used to determine if the requesting method or program is allowed access to the memory object. This scheme can thus be used to access any address in the memory in response to a request to look up an element.

In the example in FIG. 16, once the aforesaid method has been accessed, memory access will be allowed (lines 5 to 7) only if the memory object is not null.

In the schemes described above, the classes of programs to be given access to memory objects is restricted according to the table in unit 6. Thus amending the specifications in the table will allow the user to add to or change the programs permitted to access the memory as needed. This will allow the program to be applied flexibly according to how the system is deployed. It enables us to provide an information processing system which can be used for a wide variety of applications.

In the embodiment discussed above, access to the memory is restricted according to the name of the program. However, it would be equally acceptable to determine whether to grant a program access to the memory according to the function or type of program (e.g., granting access to applications used to calculate lists), the name of the developer, the version, the date it was created, or a password.

In both the schemes discussed above, the conditions to restrict access to the memory object are written in via a Java source program. However, access might be restricted in other ways than just the source program. It would be equally permissible to limit access at the stage where the byte code is executed.

In such a case, when unit 1 is about to execute the byte code to grant access to the memory object, it checks the result output by unit 6, the unit which restricts access. If the program belongs to a class which is not permitted access to the memory, unit 1 changes the code of the object to be accessed by that program from the code for the memory object to the code for a null object. This scheme allows us to prevent a program which should not have access from improperly accessing the memory even if permission to access has somehow been written in.

In the information processing systems shown in the aforesaid FIGS. 1, 6 and 9, only one virtual array object has been generated as a memory object. However, the invention is not limited to this case only. It would also be acceptable for a number of virtual objects of different types, such as byte and int arrays, to be generated, and for access to be granted to different objects according to the type of data.

In all of the aforementioned information processing systems, the memory object was of a size proportional to the total number of addresses in the memory. However, the invention is not limited to this case only. An accessible area of the memory might be defined, and a virtual object might be created which corresponded to this area (hereafter referred to as the "accessible area"). This would allow us to provide an information processing system appropriate for devices whose access to the memory had to be restricted. It would also make it possible to set up a number of different virtual objects so that the location and size of the accessible area could vary according to the name or type of program.

Figure 17:
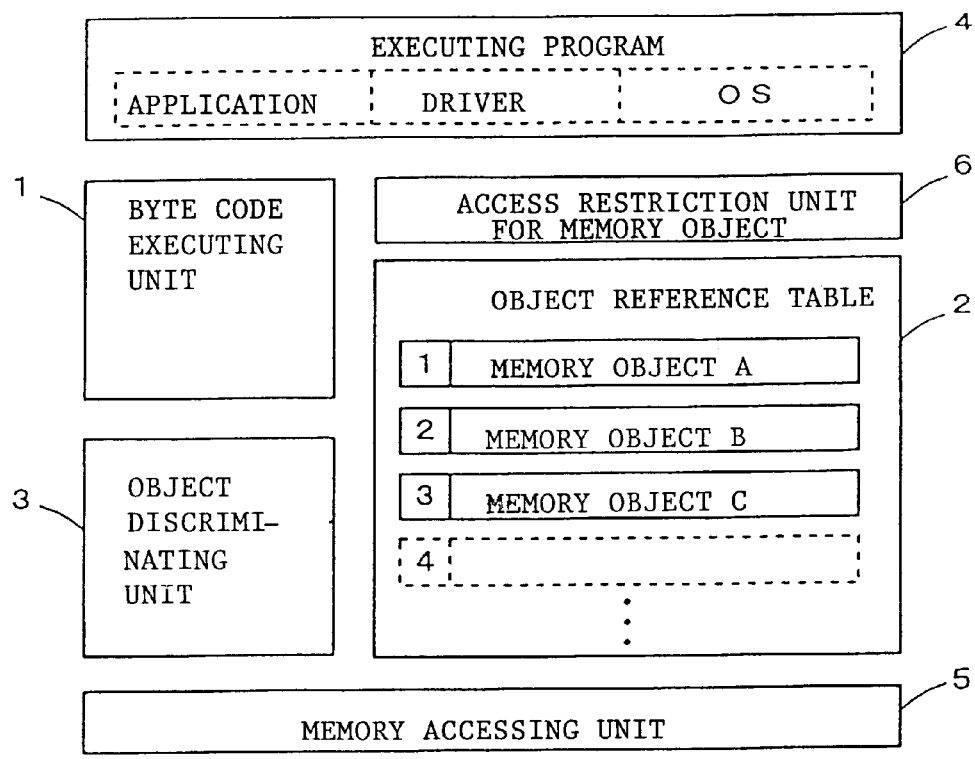
FIG. 17 is an example of how a system might be configured in which several different accessible areas are created and each is accessible to a different kind of program.

FIG. 17 is an example of how a system might be configured in which several different accessible areas are created and each is accessible to a different kind of program. The basic configuration is identical to that shown in FIG. 9; but three kinds of virtual array objects with the names memory object A, memory object B and memory object C are stored in table 2 with the corresponding numbers "1", "2" and "3".

Just as in the embodiments discussed previously, memory object A with identification number "1" is of a size proportional to the total number of addresses in the memory. Memory objects B and C correspond to areas defined in the memory to which access is permitted. (Hereafter, when these three kinds of objects are referred to generically, they are called "memory objects.")

Figure 18:
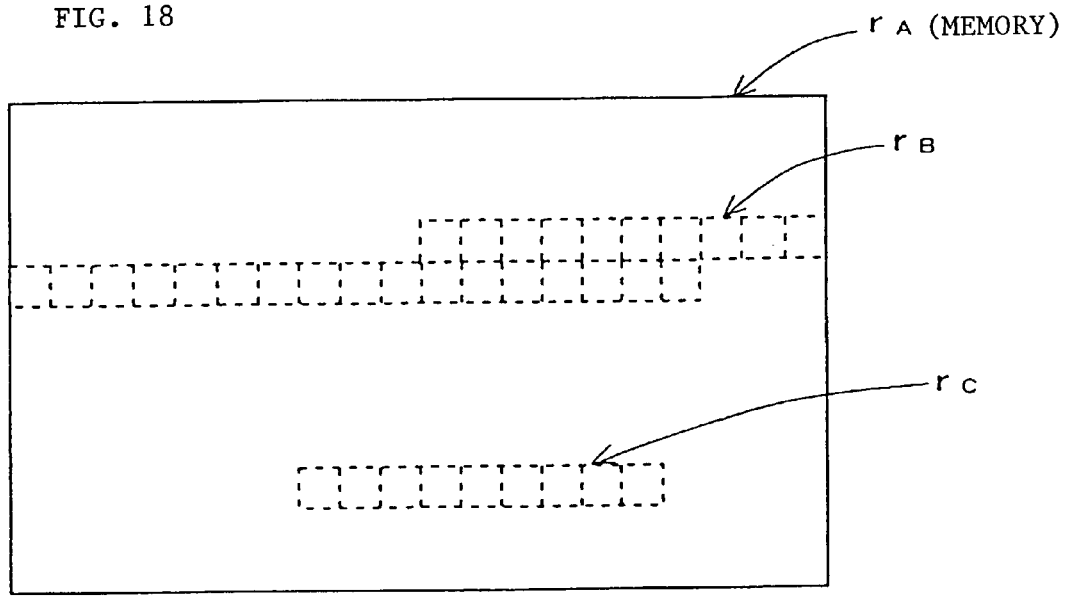
FIG. 18 shows examples of accessible areas corresponding to these memory objects.

FIG. 18 shows examples of accessible areas corresponding to these memory objects. In the figure, $r_A$ is the accessible area corresponding to memory object A; that is, it includes the entire memory. $r_B$ and $r_C$ are the accessible areas corresponding to memory objects B and C. They represent parts of the memory. It would also be possible to have parts of areas $r_B$ and $r_C$ overlap or have one of the areas subsumed in the other.

In this embodiment, when the system is activated a table 2 is set up in which are stored memory objects for all three numbers, with each linked to the head address and the size of the array for a corresponding accessible area. For each class, the scheme by which memory objects are accessed is the same as that used in the embodiment in the aforesaid FIG. 9.

With this configuration, every subprogram in the program being executed is allowed to access the appropriate memory objects according to the name of its class or what type of program it is. If a program attempts to access a memory object which is off limits or an element outside the boundaries of an accessible memory object, unit 1 to execute byte code will output an error message, just as it would if the element being looked up were in an ordinary array object; and the program will be denied access.

For example, if accessible area $r_B$ corresponds to the area normally accessible to driver class programs, and accessible area $r_C$ represents an area where corruption of the data will not pose a substantial problem, an OS class program, which must be able to access the entire memory, will be permitted to access memory object A; a driver class program will be permitted to access memory object B; and an application class program will be permitted to access memory object C. We can thus set the boundaries of accessible areas of the memory according to the function and reliability of each program. The fact that we can allow relatively unreliable programs limited access to the memory enables us to provide an information processing system which is safer and more practical.

The information processing systems shown in the aforesaid FIGS. 1, 6, 9 and 17 all use Java as the source program. However, the information processing system could be configured in the same way using an object-oriented source language other than Java so long as it did not access the memory using a pointer. Even languages like C++ which employ a pointer to access the memory could be used if they were fitted with a special compiler to prevent memory access by pointer or if the pointer access processing were prevented by language specifications. This would allow the same type of information processing system to be realized, and would overcome the shortcoming of prior art systems which allowed the memory to be accessed by an illicit pointer from outside the system.

With the invention disclosed in claim 7 of this application, a number of virtual array objects of different types are stored in the aforesaid object reference table.

With the invention disclosed above, a virtual array object of a size commensurate with the number of addresses in the memory is created. The desired address in the memory can be, thus, accessed by executing a program to look up a given element of the object.

This configuration, therefore, allows a program language such as Java, which has no pointers, to access the memory simply and quickly.

Since it looks up a given element of the virtual array object just like of an ordinary array object, the system does not use a separate compiler, so this system can be installed in any universal program environment.

With the invention in claim 2, only permitted programs can look up the aforesaid virtual array object; it allows only select programs to access the memory. The system prevents data from being improperly written over in the memory and it can make a reliable data processing system.

With the invention in claim 3, a table can set up the programs which is allowed access to the memory. This configuration makes it easy to change or add permitted programs which are allowed access to the memory. It also allows flexible system changes and versioning up during data processing system development.

With the invention in claim 4, programs are permitted access only to an area of a given size in the memory which is designated as accessible, and they are forbidden access to addresses outside this area. This configuration, therefore, makes it easy to install this system in a device which requires a restricted or controlled memory area.

With the invention in claim 5, a number of areas are established to which access depends on the type of program being executed and its capabilities. This allows the areas which may be accessed to vary depending on the program being executed and it makes it possible to install this system in a low reliability device by allowing access only to the memory area which could be destroyed.

With the invention in claim 6, a virtual array object, which is not defined in an actual program, is created when the object reference table is set up as the computer is initialized. This configuration eliminates the additional processing to access to the memory by creating the access reference table at initial start up.

With the invention in claim 7, a number of array objects of different sizes and types are created in the object reference table. By changing the object to be looked up, one can make it conform to the shape of the data when it is accessed.

What is claimed is:

1. An information processing system for processing an object oriented program installed in a computer, comprising:

an object reference table to identify data storage areas for a plurality of objects referenced in said object oriented program; and a program executing means to execute said object oriented program while identifying said data storage areas for said plurality of objects by means of said object reference table;

wherein said object reference table is able to store a plurality of virtual array objects which have a proportional size to the total number of addresses of a memory unit provided in said computer; and wherein, when said program executing means receives a command from said object oriented program to look up a given element in one of said virtual array objects, said program executing means identifies that the entire memory is one of said data storage areas for one of said virtual array objects, and then looks up said given element in one of said virtual array objects.

2. An information processing system according to claim 1, wherein said object reference table in which said virtual array object is already provided is initialized when said computer is started.

3. An information processing system according to claim 1, wherein said plurality of virtual array objects are different types and are stored in said object reference table.

4. An information processing system for processing an object oriented program installed in a computer, comprising:

an object reference table to identify data storage areas for a plurality of objects referenced by said object oriented program;

a program executing means to execute said program while identifying said data storage areas for said plurality of objects by means of said object reference table; and an access restricting means to restrict access to said data storage areas depending on what sort of program is to be executed;

wherein said object reference table is able to store a plurality of virtual array objects which have a proportional size to the total number of addresses of a memory unit provided in said computer; and wherein, when said program executing means receives a command from said object oriented program to look up a given element in one of said virtual array objects whose access is permitted by said access restricting means, said program executing means identifies that the entire memory is one of said data storage areas for one of said virtual array objects, and then looks up said given element in one of said virtual array objects.

5. An information processing system according to claim 4, wherein said access restricting means is provided with a restriction table to determine which program is permitted to access said data storage areas.

6. An information processing system for processing an object oriented program installed in a computer, comprising:

an object reference table to identify data storage areas for a plurality of objects defined in said object oriented program; and a program executing means to execute said program while identifying said data storage areas for said plurality of objects by means of said object reference table;

wherein said object reference table is able to store a plurality of virtual array objects which have a proportional size to the limited number of addresses of a permitted data storage area in a memory unit whose access is permitted; and wherein, when said program executing means receives a command from said object oriented program to look up a given element in one of said virtual array objects, said program executing means identifies that said permitted data storage area is for one of said virtual array objects, and then looks up said given element in one of said virtual array objects.

7. An information processing system for processing an object oriented program installed in a computer, comprising:

an object reference table to identify data storage areas for a plurality of objects referenced by said object oriented program;

a program executing means to execute said program while identifying said data storage areas for said plurality of objects by means of said object reference table; and an access restricting means to restrict access to said data storage areas by selecting a specific data area out of a plurality of permitted data storage areas depending on what sort of program is to be executed;

wherein said object reference table is able to store a plurality of virtual array objects which have a proportional size to the limited number of addresses of said plurality of permitted data storage areas in a memory unit whose access is permitted; and wherein, when said program executing means receives a command from said object oriented program which is permitted to access one of said plurality of permitted data storage areas by said access restricting means, to look up a given element in one of said virtual array objects, said program executing means identifies that one of said plurality of permitted data storage areas is for one of said virtual array objects based on a setting of said object reference table, and then looks up said given element in one of said virtual array objects.

* * * * *